US011967878B2

(12) United States Patent
Iwaschtschenko et al.

(10) Patent No.: US 11,967,878 B2
(45) Date of Patent: Apr. 23, 2024

(54) COOLING CHANNEL FOR A WINDING OVERHANG OF A STATOR, AND STATOR COMPRISING A COOLING CHANNEL OF THIS TYPE

(71) Applicant: JHEECO E-DRIVE AG, Eschen (LI)

(72) Inventors: Andreas Iwaschtschenko, Hochst (AT); Martin Stöck, Salez (CH)

(73) Assignee: JHEECO E-DRIVE AG, Eschen (LI)

( * ) Notice: Subject to any disclaimer, the term of this patent is extended or adjusted under 35 U.S.C. 154(b) by 427 days.

(21) Appl. No.: 17/299,622

(22) PCT Filed: Dec. 11, 2019

(86) PCT No.: PCT/EP2019/084726
§ 371 (c)(1),
(2) Date: Jun. 3, 2021

(87) PCT Pub. No.: WO2020/120611
PCT Pub. Date: Jun. 18, 2020

(65) Prior Publication Data
US 2022/0021274 A1      Jan. 20, 2022

(30) Foreign Application Priority Data
Dec. 12, 2018   (DE) ...................... 10 2018 131 962.2

(51) Int. Cl.
*H02K 5/20*       (2006.01)
*H02K 9/19*       (2006.01)
*H02K 9/197*      (2006.01)

(52) U.S. Cl.
CPC ............. *H02K 5/203* (2021.01); *H02K 9/197* (2013.01)

(58) Field of Classification Search
CPC .......... H02K 5/203; H02K 9/197; H02K 3/50; H02K 3/505; H02K 9/00; H02K 9/16; H02K 2209/00; H02K 3/24
See application file for complete search history.

(56) References Cited

U.S. PATENT DOCUMENTS

| 8,093,770 B1 | 1/2012 | Berhan |
| 2011/0316367 A1* | 12/2011 | Takahashi ................ H02K 3/24 |
| | | 310/54 |

(Continued)

FOREIGN PATENT DOCUMENTS

| DE | 102015220112 A1 | 4/2017 |
| DE | 102017103378 A1 | 8/2017 |

(Continued)

OTHER PUBLICATIONS

International Search Report of PCT/EP2019/084726 dated Mar. 19, 2020.

*Primary Examiner* — Thomas Truong
(74) *Attorney, Agent, or Firm* — Calfee, Halter & Griswold LLP

(57) ABSTRACT

The invention relates to a cooling channel for a winding head of an electric machine, where the cooling channel is formed to be annular for guiding a cooling fluid with at least one inflow and at least one outflow and for being arranged around the winding head With the aim of an improved sealing property, the cooling channel comprises an axially movable pressing member which is arranged such that a cooling fluid can flow onto the pressing member and a pressing force against the cooling channel can be generated.

11 Claims, 3 Drawing Sheets

(56) References Cited

U.S. PATENT DOCUMENTS

2013/0026867 A1* 1/2013 Deguchi ................ H02K 9/197
                                                        310/53
2017/0025911 A1* 1/2017 Jewell ..................... H02K 3/24
2017/0271956 A1* 9/2017 Hanumalagutti ...... H02K 9/197
2017/0310189 A1  10/2017 Hanumalagutti et al.

FOREIGN PATENT DOCUMENTS

| JP | 4586408 B2 | 11/2010 |
| JP | 2014042414 A | 3/2014 |

* cited by examiner

COOLING CHANNEL FOR A WINDING OVERHANG OF A STATOR, AND STATOR COMPRISING A COOLING CHANNEL OF THIS TYPE

CROSS-REFERENCE TO RELATED APPLICATIONS

The present application is the national stage of PCT Application No. PCT/EP2019/084726, filed on Dec. 11, 2019, which claims priority to the German patent application No. 102018131962.2, filed on Dec. 12, 2018, which are incorporated herein by reference in their entireties.

The invention relates to a cooling channel for a winding head of an electric machine as well as to a stator comprising such a cooling channel.

The term "electric machine" is to be understood to mean substantially an electric motor or an electric generator with a stator and a rotor, where the rotor is mounted to be rotatable about a common longitudinal axis relative to the stator.

The stator comprises, for example, a laminated stator core and a current-carrying winding. The winding can be arranged in axially extending slots of the laminated stator core that are distributed over the circumference. The winding forms a plurality of coils/half-coils, where one coil/half-coil comprises two current conductor sections running in different slots and two/one connecting section(s) connecting the current conductor sections at the end side of the laminated stator core. Only the portion of the winding running axially within a slot contributes to the torque; it is also referred to as the active length. In contrast, the current conductor sections which electrically connect the active lengths at the face sides of the laminated core (connecting sections) are blind to the torque; this portion located axially outside the laminated core is also referred to as the winding head. A winding head can consequently be viewed as the portion of a winding which projects axially beyond a laminated stator core.

Wire coils can be considered as windings. It is also known that a winding can also be composed of rod conductors which can be inserted or drawn into slots of a laminated core. The rod conductors are connected in pairs to form half-coils. This can be done directly, for example, by bending the rod conductors towards one another and welding them together directly, or also indirectly, for example, by way of interconnection webs bridging the distance between two rod conductors.

As the temperature increases, the degree of efficiency of electric machines, in particular of traction motors for electrical vehicles, decreases, which is why the electric machines are known to be cooled by way of a cooling fluid. This is done, for example, by way of a cooling sleeve/channel or cooling jacket through which water flows which indirectly cools a stator or its laminated stator core. Indirect cooling means that the cooling fluid and the heat source are not in direct contact. In order to increase the degree of efficiency, it is also known to cool winding heads directly. Dielectric oil is usually used which is pumped through the winding head.

U.S. Pat. No. 2,017,310 189 describes winding head cooling in the form of a cooling cap for electric motors.

DE 10 2015 220 112 A1 describes a cover unit for a winding head of an electric machine, where the cover unit comprises a cooling channel which extends along the circumferential direction of the stator.

Cooling caps for cooling for direct cooling of winding heads are shown, for example, by:

JP4586408B2 shows a cooling cap for a winding head. The oil inlet is axially, the outlet is attached radially. The fluid pressure acting upon the cooling cap is absorbed directly by a housing shield/cap, i.e. the face side of the cooling cap is in direct contact with the housing shield, cf. FIG. 3.

The cooling cover is there intended to seal the winding head space as effectively as possible. Depending on the operating conditions, this is not always possible. Examples are high pressures of the cooling fluid. Another influencing variable is thermal expansion, in particular different expansion of the motor housing and the cooling cap. In the case of high heat fluctuations or high pressures, the holding force originally applied by the bearing cove is not sufficient for a reliable seal. Material fatigue (deteriorating spring properties of the sealing material/cooling cap/ . . . ) can also lead to leaks.

At fluid pressures of approx. 0.5 bar, forces of a few kN must be maintained (with an effective pressure area of approx. $2*10 L 6$ mm$^2$—this corresponds roughly to a circular ring with an outer diameter of 300 mm and an inner diameter of 200 mm—the resulting forces are approx. 10 kN).

The cooling cap can be affixed circumferentially by pressing the cooling cap into a stator sleeve. Here as well, different coefficients of thermal expansion lead to a gap possibly forming between the cooling cap outer jacket (or retaining elements) and the stator sleeve. A reliable cooling seal is not achieved as a result.

It is also possible to generate and maintain a pretension force using additional components (spring washers or the like). However, additional components are undesirable because they increase costs and the structural complexity of the cooling cap.

It is therefore the object of the present invention to specify an improved winding head cooling in which the sealing and attachment properties are improved.

As a solution for this, a cooling channel according to claim 1 is provided by the invention. In detail, a cooling channel for a winding head of an electric machine is specified, where the cooling channel is formed to be annular for guiding a cooling fluid with at least one inflow and at least one outflow and for being arranged around the winding head. The cooling channel comprises an axially movable pressing member which is arranged such that a cooling fluid can flow onto the pressing member and a pressing force can be generated against the cooling channel.

Since the pressing member is pressed onto a part or region of the cooling channel that is in particular disposed opposite to it, the cooling channel is thereby advantageously sealed, in particular separately. In addition, the pressing force presses the cooling channel onto the components of the stator that are abutting against the outer side of the cooling channel, and a seal between the cooling channel and these components is improved. For having the pressing member be movable, the pressure from the outside onto the pressing member should be greater than the pressure from the inside, in particular from the cooling channel, onto the pressing member. If the pressing member is configured and/or arranged such that it is not exposed to the internal pressure, e.g. by a (in particular fluid-free) buffer space/zone formed between the pressing member and the fluid-carrying region of the cooling channel, the motion of the pressing member for sealing is dependent only on the prevailing external pressure and not or hardly on the internal pressure.

The pressing member is preferably mounted such that it is arranged as a separate component without special fixation in an intermediate space between a cover and the winding head. In this intermediate space, the axially movable pressing member is preferably inserted having a pretension in the direction of the winding head. The pretension can preferably be caused by an elastic element, such as a rubber disk or an elastomeric disk or a spring, and thereby ensure a simple seal. However, due to the flow conditions in the cooling channel, the movable pressing member is pressed with increased pretension in the direction of the winding head during a circulation of the cooling liquid, so that high internal flow pressures of the cooling liquid can also be reliably sealed. Furthermore, it is conceivable and possible to keep the wall thickness of the sealing disk small by way of these functions, since the pressure balance keeps the loads acting upon the walls relatively low compared to solutions in which this pressure balance is not set.

It is also conceivable and possible to insert the cover disk into the cooling channel with a simple adhesive connection. However, it is sufficient to configure this connection such that it would not withstand the high internal pressures that can arise during the cooling operation.

It can be provided that the pressing member is pre-affixed by, for example, a slight interference fit such that it can absorb minor forces. As a result, the position of the pressing member can be secured during and after assembly as well as when circulation of the coolant is lacking.

A further advantage of the cooling channel according to the invention is the improved attachment. The pressing force prevents or makes it more difficult for the cooling channel installed in the stator or on the winding head to part from its predetermined position e.g. due to vibrations, and be pushed out of the stator. As a result, no further attachment elements are necessary, which would increase costs and the structural complexity.

It is advantageous that the improved attachment and sealing effect of the pressing member is given only when the pressing member is pressurized, i.e. only during active operation of the electric machine or when the coolant is circulating, respectively. As a result, the static load on parts of the cooling channel during non-operating times can be reduced and the service life of individual components can be increased. The inflow and/or the outflow are preferably configured as an annular gap, where the inflow and the outflow are separated from one another by the pressing member in the form of an annular ceiling section of the cooling channel. This increases the amount of fluid that can flow into and out of the cooling channel and thereby the cooling effect.

In a further advantageous embodiment, the cooling channel has a plurality of partition walls, where at least some of the plurality of partition walls are arranged ray-like and form radial partition walls. This enables laminar fluid flows which promote the fluid to drain and thus reduce the internal pressure in the cooling channel.

At least some of the plurality of partition walls can also comprise insulation rings arranged concentrically and parallel to one another. Similar to the radial partition walls, they help to create orderly fluid flows and promote the fluid to flow off. In addition, these partition walls can serve as supports for the interconnection webs of a winding head.

In order to better attach the interconnection webs of the winding head and to hold them in their predetermined positions, the partition walls preferably comprise attachment elements, in particular clip, clamp, or knob elements.

It has also proven to be advantageous to have the plurality of partition walls and/or the cooling channel be formed from elastic material. This facilitates, firstly, the manufacturing due to known processes, such as injection molding, and, secondly, the sealing properties of the cooling channel.

The cooling channel is preferably configured to be multi-part. Such a configuration of the cooling channel facilitates the introduction of the winding head or its components, such as the interconnection webs, into the cooling channel.

To save further costs, the cooling channel can use or comprise a stator cooling housing as the outer side wall and a sealing mat as a base component/wall to improve the sealing property. The sealing mat is preferably formed integrally in order to keep the number of parts low. A multi-part configuration, in particular a sectoral division into a plurality of ring sector sections around the axis of rotation and/or a radial division into a plurality of concentric sealing elements, is likewise possible.

Furthermore, the pressing member, as an outer part of the cooling channel, can be moved towards an oppositely disposed outer part of the cooling channel such that connecting regions between wall parts of the cooling channel are compressed more in order to improve the sealing property.

In a further advantageous embodiment, the cooling channel and in particular the pressing member can be configured such that the external pressure upon the pressing member can be generated by a first fluid and the internal pressure upon the pressing member prevailing in the cooling channel can be generated by a second fluid. The first and the second fluid can there be different and/or of different origins. In another preferred case, the fluid that generates the external pressure upon the pressing member or the cooling channel can be the same fluid that generates the internal pressure. The cooling channel is there preferably configured such that the fluid flows from the outside into the cooling channel and subsequently out of the cooling channel. The pressurized fluid can there generate a pressing force upon the pressing member. The overpressure and therefore the pressing force can advantageously be influenced by further design elements such as a throttle, in particular a diaphragm or a nozzle or the configuration, e.g. of an annular gap inflow or a similar opening. The fluid subsequently exits the cooling channel, e.g. via an annular gap outflow or a similar opening, without or hardly building up any internal pressure due to flow turbulence, but preferably a negative pressure due to laminar or unrestrained fluid flow.

The invention furthermore relates to a winding head cooling for an electric machine with a first fluid channel/cooling shaped like an annular chamber which encloses a winding head for guiding a cooling fluid with at least one inflow and at least one outflow, and a second fluid channel shaped like an annular chamber which extends in a concentric manner and above the first fluid channel shaped like an annular chamber, comprises an inflow, and is fluidly connected to the first fluid channel shaped like an annular chamber, where the wall of the second fluid channel comprises a pressing member which is arranged such that a cooling fluid can flow onto the pressing member and exerts a pressing force upon wall parts of the first fluid channel.

The pressing member is preferably axially movable, and the fluid channel shaped like an annular chamber comprises a sealing device which allows for a respective motion.

The invention also provides a stator, in particular for an electric motor, with a plurality of rod conductors, where the stator comprises at least one cooling channel according to the invention and the partition walls of the cooling channel are arranged between at least some of the rod conductors.

The stator can also comprise a plurality of connecting webs corresponding to the rod conductors.

Furthermore specified is an electric machine comprising a cooling channel according to the invention or a stator according to the invention.

The invention also relates to a method for (axially) attaching and sealing a cooling channel, where the cooling channel (viewed axially) has a walled upper side and underside, where the wall of the cooling channel is supported mechanically on one side and fluidically on the other side.

The figures described below relate to preferred embodiments of the cooling channel according to the invention and of the stator according to the invention, where these figures do not serve as a restriction but essentially to illustrate the invention. Elements from different figures but with the same reference symbols are identical; therefore, the description of one element from one figure is also valid for elements with the same designation or the same number from other figures, where FIG. 1 shows a cross-sectional view onto an electric machine;

FIG. 4 shows a stator with a cooling channel according to the present invention and with fluid flows and pressing forces drawn in; and FIG. 5 shows a longitudinal sectional view through an upper part of a stator, in particular its winding head with a cooling channel according to the invention, where fluid flows and pressing forces have been drawn in.

Figure 1:
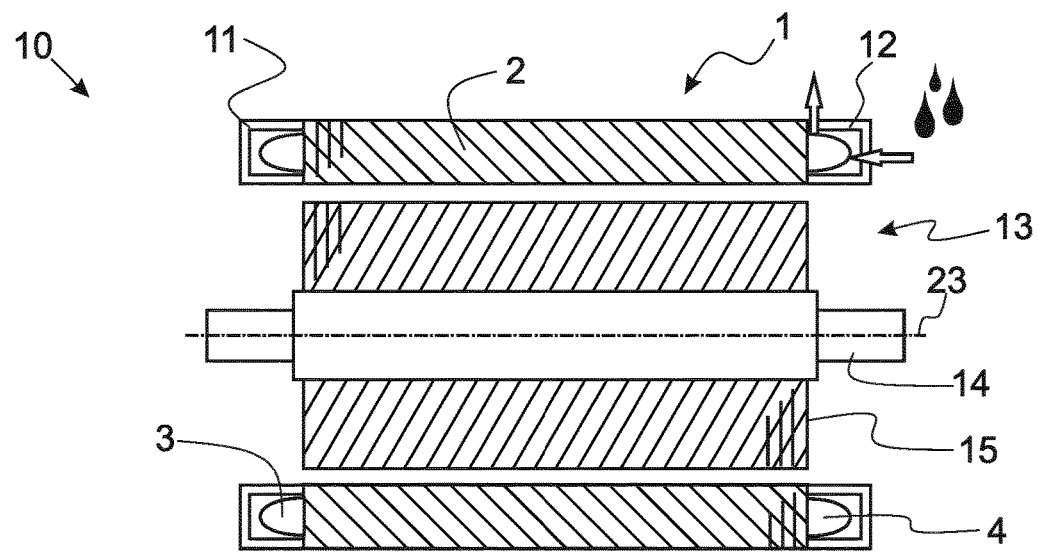

FIG. 1 shows a cross-sectional view of an electric machine 10 with a stator 1 and a rotor 13 arranged within the stator. Stator 1, in particular laminated stator core 2, is hollow-cylindrical and comprises a respective annular cooling channel 11 and 12 at each end. Cooling channels 11, 12 are connected to a fluid reservoir (not shown) for cooling winding heads 3, 4 formed or arranged in the cooling channels by way of a fluid (see arrows, one pointing inwardly and one pointing outwardly. Rotor 13 is formed by a rotor shaft 14 and a laminated rotor core 15, where the rotor can comprise, for example, permanent magnets, a short-circuit cage, or a current-excited winding, depending on the configuration. Electric machine 10 (and therefore stator 1 and rotor 13) is configured to be rotationally symmetrical about axis of rotation 23.

Figure 2:
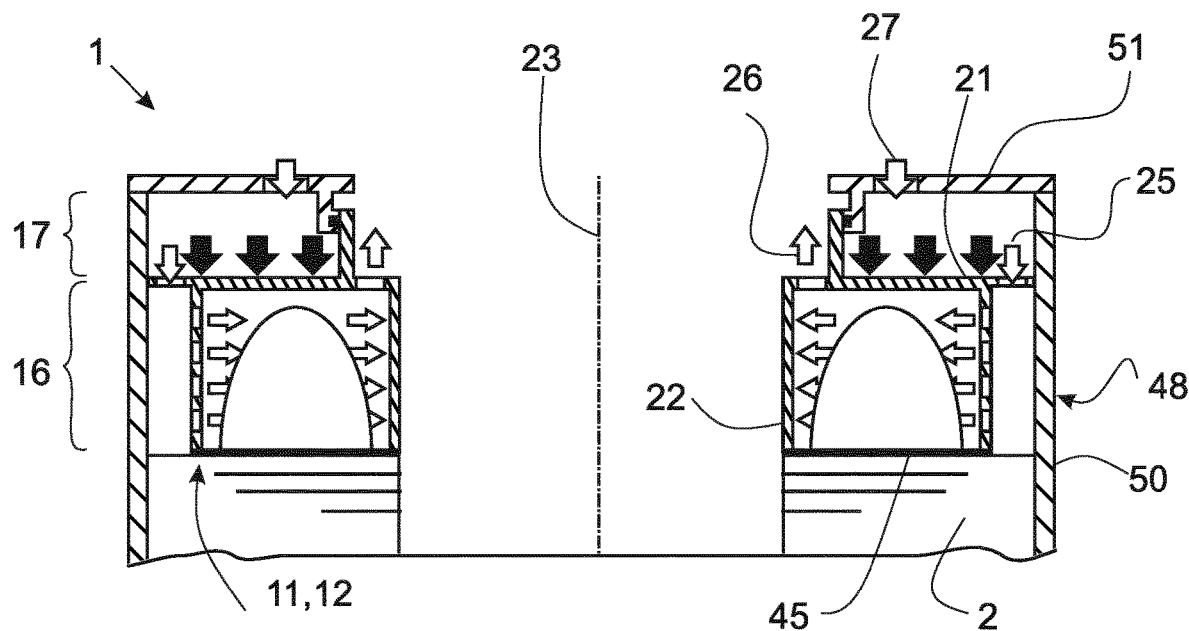
FIG. 2 shows a cross-sectional view through a cooling channel according to a preferred embodiment.

FIG. 2 shows a greatly simplified cross-sectional view through a cooling channel 11 or 12 according to a preferred embodiment which is arranged on and attached to a laminated stator core 2 of a stator 1, where the embodiment is explained using a composite winding by way of example. Instead of the composite winding, however, other winding types such as pull-in windings, concentrated windings, or composite windings without interconnection webs (known for example made of Flairpin windings) with correspondingly configured winding heads are also possible.

The cylindrical laminated stator core 2 comprise a plurality of elongate notches or slots in which a plurality of rod conductors (not shown) is arranged in parallel and concentric about axis of rotation 23. Stator 1 itself is formed in a housing, in particular in a fluid housing 48 with a cylindrical outer wall 50 and an annular cover 51. Cooling channel 11 substantially comprises a cover unit or cover 21 with an inner ring 22 or a cylindrical inner wall 22 as well as an annular sealing mat 45. Cover 21 there functions as a pressing member that presses downwardly with a corresponding external pressure or inner ring 22 as well as vertical partition walls (not shown) of cover 21 against sealing mat 45 and thereby improves the sealing property of the cooling channel. The sealing mat is formed integrally and is preferably made of elastic and/or compressible material. In combination with fluid housing 48 and laminated stator core 2, cover 21 forms a first annular chamber 16 and a second annular chamber 17 of the cooling channel. The interconnection webs (not shown) of the winding head are arranged in the annular chamber 16 and interconnected with the rod conductors. In addition, first annular chamber 16 is fluidly accessible only via annular gap inflow 25 and annular gap outflow 26. First annular chamber 16 is formed by outer wall 50, inner ring 22, cover 21, and sealing mat 45. Sealing mat 45 serves as a base/wall for first chamber 16 or for the cooling channel and comprises openings or recesses through which the rod conductors can project from laminated stator core 2 into first chamber 16. In addition, sealing mat 45 seals laminated stator core 2 against the cooling channel. Second annular chamber 17 is defined and formed by cover 21, outer wall 50, and cover 51 and is arranged above first annular chamber 16. Two chambers 16 and 17 are connected to one another via annular gap inflow 25. Furthermore, an inflow opening 27 is formed in the cover through which a fluid can flow from the outside into second chamber 17. The filled arrows on cover 21 describe the pressing forces. The arrows that are not filled show the fluid flow from the outside into second chamber 17, then into first chamber 16, and subsequently to the exterior.

Figure 3:
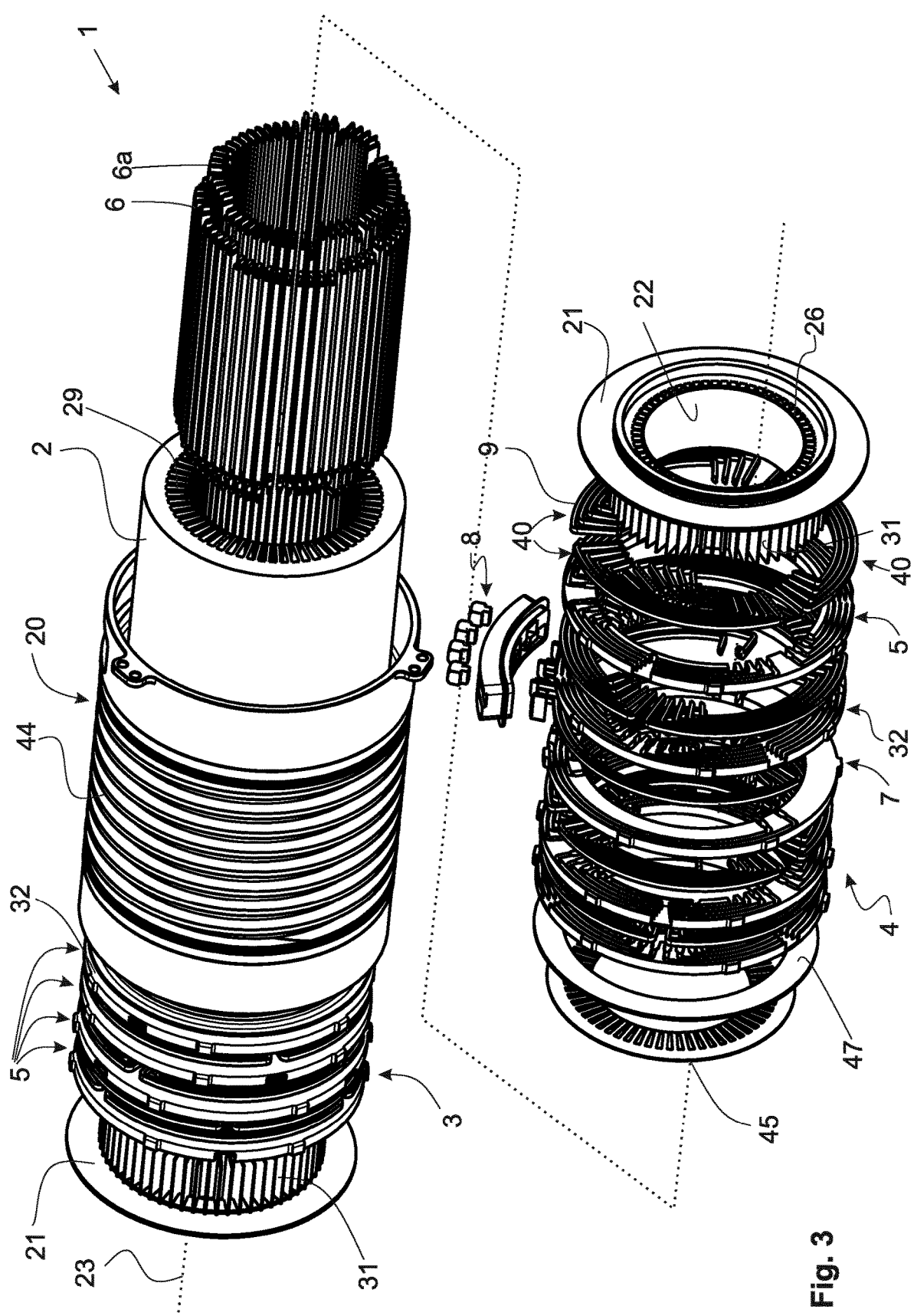
FIG. 3 shows an exploded view of a stator according to the invention with two winding heads and cooling channels.

FIG. 3 shows an exploded view of a stator 1 according to the invention with a winding composed of rod conductors and interconnection webs which form two annular or cylindrical winding heads 3 and 4 and cooling channels. Stator 1 is equipped with a laminated core 2, in the slots or slot region 29 of which formed on the inside rod conductors 6 and 6a are arranged concentrically about axis of rotation 23. Winding head 3 is arranged on one side for connecting rod conductors 6 and 6a at one end to respective interconnection webs 9. Other winding head 4 is arranged on the other side of laminated core 2 and differs from first winding head 3 in that it comprises an additional interconnection plane 7 with phase connection(s) 8. First winding head 3 therefore comprises four interconnection planes 5 and second winding head 4 comprises four interconnection planes 5 and an interconnection plane 7 with phase connection(s) 8. Both winding heads 3 and 4 are arranged one above the other with a sealing mat 45, an adapter piece 47, four interconnection planes 5 with corresponding interconnection webs 9, or with three groups of interconnection webs 40 composed of five interconnection webs 9. Each interconnection plane 5 or 7 is arranged in its own insulation ring 32 which comprises corresponding slots or partition walls in which interconnection webs 9 are arranged and held. Interconnection webs 9 are arc-shaped rod conductors with rod conductors which additionally extend radially to the axis of the stator and the function of which is to electrically connect rod conductors 6 in pairs. Rod conductors 6 and 6a are connected to one another according to a predetermined pattern, for which reason the distance or the number of interconnection webs 9 between rod conductors 6 and 6a connected in pairs is predetermined. A cover element 21 is provided as the termination of stator 1 and comprises an inner ring 22 and perpendicularly arranged radial partition walls 31. Interconnection planes 5 and 7 are all arranged perpendicular to axis of rotation 23 of stator 1, whereas rod conductors 6 are arranged parallel to this axis. Axis of rotation 23 describes the axis of a rotor (not shown) that can be inserted into stator 1 and at the same time serves to describe and relate to each other the geometric properties of the elements of stator 1, such as laminated stator core 2, rod conductor 6, interconnection planes 5, etc.

Figure 4:
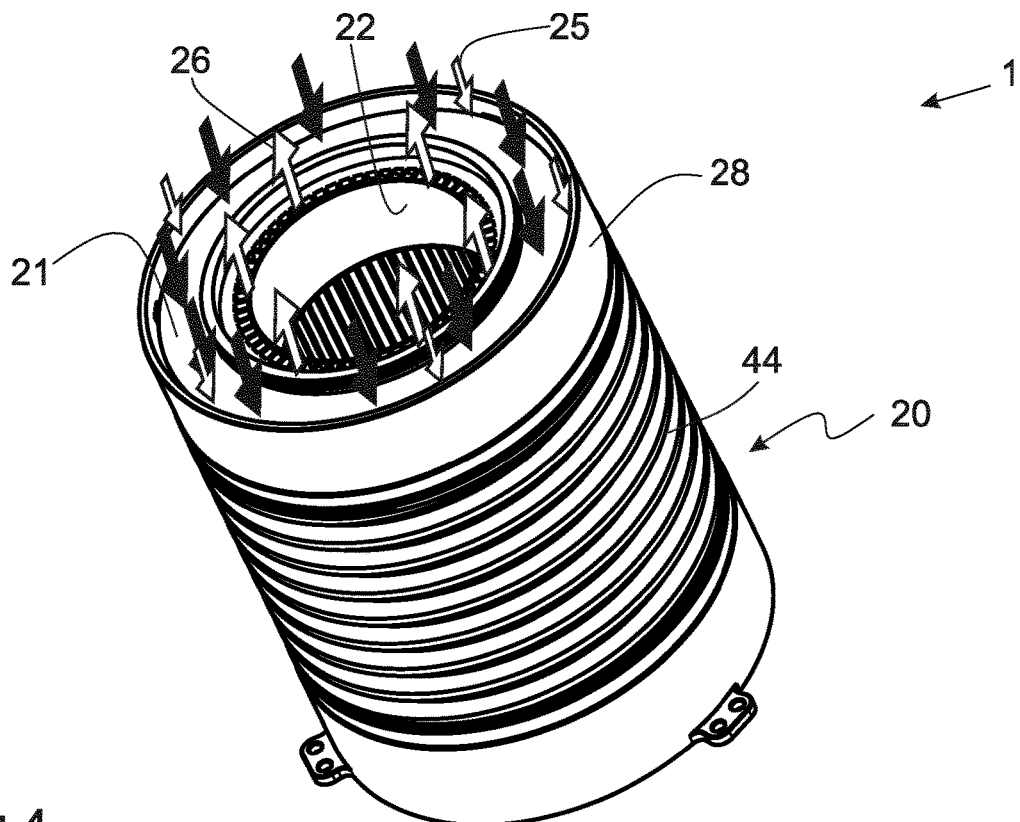

FIG. 4 shows a perspective view of a stator 1 similar to FIG. 3 with a cooling channel according to the present invention and with fluid flows drawn in (see arrows that are not filled) and pressure forces (see filled arrows). Stator 1 is configured with a cooling housing 20 and cooling ribs or a winding 44, respectively. Cover unit 21 with inner ring 22 can be seen on the upper side and, in combination with outer ring 28 of cooling housing 20, form annular gap inflow 25 and annular gap outflow 26.

Figure 5:
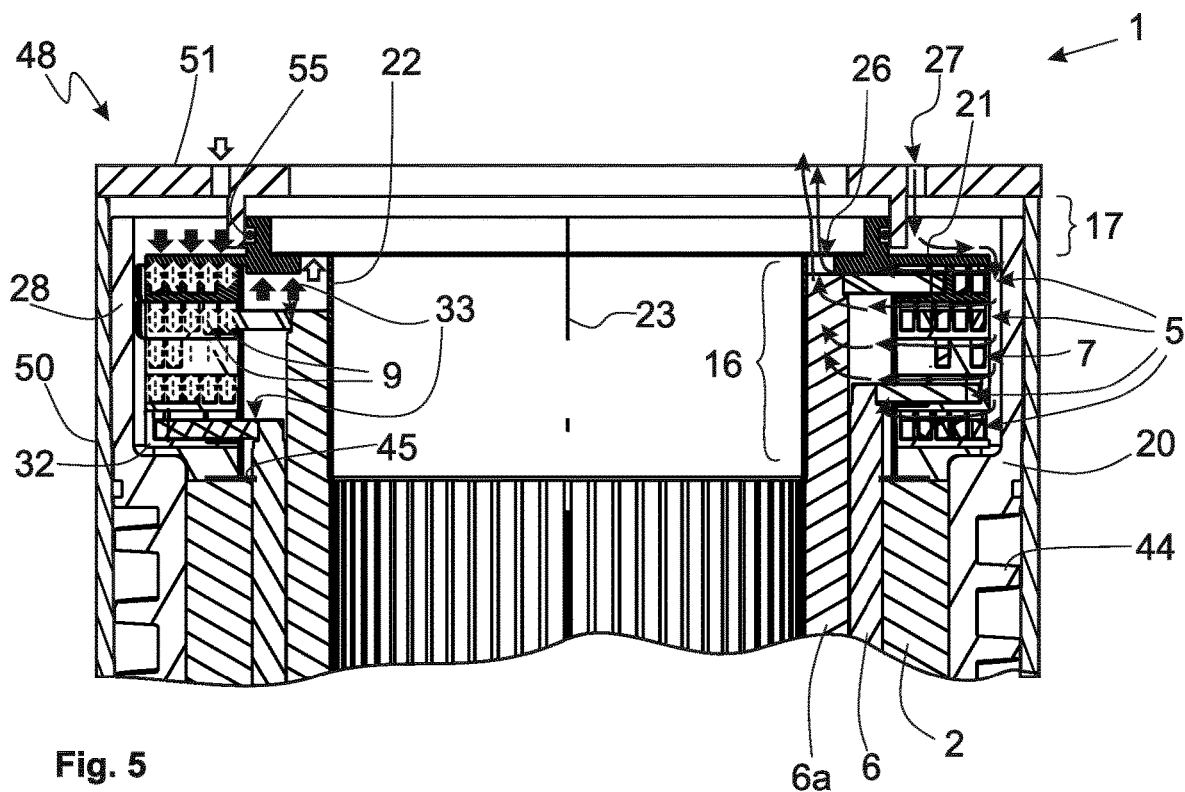

FIG. 5 shows a longitudinal sectional view through an upper part of a stator 1 similar to FIGS. 3 and 4, in particular its winding head with a cooling channel according to the invention, where fluid flows are shown on the right-hand side of the figure. Stator 1 is equipped with a cooling housing 20 and a fluid housing 48. Fluid housing 48 has a cylindrical outer wall 50 and an annular cover 51. Outer wall 50 abuts directly against cooling housing 20. Cover 51 is attached to outer wall 50 and comprises one or more openings 27 for a fluid inflow and an opening for a fluid outflow. Cover 51 can also be configured as a bearing shield for supporting a rotor or a rotor bearing. Fluid inflow 27 is directed towards cover unit 21 and presses it by way of a fluid flow downwardly or onto laminated stator core 2. Cover unit 21 is formed to be movable relative to cover 51 in the axial direction. Disposed between cover unit 21 and cover 51 is a sealing device 55, in the present example an O-ring, which seals annular gap 17 against the interior of the stator or fluid outlet 26, respectively. Laminated stator core 2 with rod conductors 6 and 6a, as well as the winding head with various interconnection webs 9, insulation rings 32 of cover unit 21 with inner ring 22, and annular gaps formed as a result for inflow and outflow 25 and 26 are clearly visible in the enlarged cross-section along the longitudinal axis or axis of rotation 23 of stator 1. Webs 9 and conductors 6, 6a are attached, in particular welded, to one another at contact points 33. First annular chamber 16 and second annular chamber 17 arranged thereabove are separated from one another by cover unit 21 and connected to one another by inflow 25.

In particular the plurality of stacked insulation rings 32 can be pressed against one another and sealed against one another by way of pressurized cover unit 21 in a simple manner at their contact points or surfaces.

LIST OF REFERENCE CHARACTERS 1 stator
2 laminated stator core
3 winding head side A
4 winding head side B
5 interconnection plane
6 rod conductor
6a rod conductor
7 interconnection plane with phase connection
8 phase connection
9 interconnection webs/end connectors
10 electric machine
11 cooling channel for winding head side A
12 cooling channel for winding head side B
13 rotor
14 rotor shaft
15 laminated rotor core
16 first annular chamber of the cooling channel
17 second annular chamber of the cooling channel
20 cooling housing/sleeve
21 cover
22 inner ring
23 axis of rotation
25 annular gap inflow
26 annular gap outflow
27 inflow opening of the fluid housing
28 outer ring
29 slots
31 partition wall, vertical
32 partition wall, horizontal or insulating ring/washer
33 contact/welding of rod conductors to interconnection web
40 group of interconnection web
44 turns/cooling ribs
45 sealing mat
47 adapter piece/ring
48 fluid housing
50 outer wall of the fluid housing
51 cover of the fluid housing
55 sealant

The invention claimed is:

1. Cooling channel for a winding head of an electric machine, where said cooling channel is formed to be annular for guiding a cooling fluid with at least one inflow and at least one outflow and for being arranged around said winding head,
wherein said cooling channel comprises an axially movable pressing member which is arranged such that a cooling fluid can flow onto said pressing member and a pressing force can be generated against said cooling channel, and
wherein said inflow or said outflow are configured as an annular gap, where said inflow and said outflow are separated from one another by said pressing member as an annular ceiling section of said cooling channel.

2. Cooling channel according to claim 1,
wherein said cooling channel comprises a plurality of partition walls and at least some of said plurality of partition walls are arranged ray-like and form radial partition walls.

3. Cooling channel according to claim 1,
wherein at least some of a plurality of partition walls of said cooling channel comprise insulation rings arranged concentrically and parallel to one another.

4. Cooling channel according to claim 1,
wherein said cooling channel is formed to be multi-part.

5. Cooling channel according to claim 4,
wherein said cooling channel comprises a sealing mat as the base component and a stator cooling housing as the outer side wall.

6. Cooling channel according to claim 4,
wherein said pressing member, as an outer part of said cooling channel, is configured to be moved toward an oppositely disposed outer part of said cooling channel such that connecting regions between wall parts of said cooling channel are compressed more.

7. Electric machine comprising a cooling channel according to claim 1.

8. Cooling channel according to claim 1,
wherein said cooling channel comprises a plurality of partition walls and at least some of said plurality of partition walls are arranged ray-like and form radial partition walls.

9. Stator for an electric motor, with a plurality of rod conductors, where said stator comprises at least one cooling channel and said partition walls are arranged between at least some of said rod conductors where said cooling channel is formed to be annular for guiding a cooling fluid with at least one inflow and at least one outflow and for being arranged around a winding head, wherein said cooling channel comprises an axially movable pressing member which is arranged such that a cooling fluid can flow onto said pressing member and a pressing force can be generated against said cooling channel, and wherein said inflow or said outflow are configured as an annular gap, where said inflow and said outflow are separated from one another by said pressing member as an annular ceiling section of said cooling channel.

10. Stator according to claim 9,
- wherein said stator comprises a plurality of connecting webs corresponding to said rod conductors.

11. Method for attaching and sealing a cooling channel, where said cooling channel has a walled upper side and underside,
- where said cooling channel is formed to be annular for guiding a cooling fluid with at least one inflow and at least one outflow and for being arranged around a winding head,
- wherein said cooling channel comprises an axially movable pressing member which is arranged such that a cooling fluid can flow onto said pressing member and a pressing force can be generated against said cooling channel,
- wherein said inflow or said outflow are configured as an annular gap, where said inflow and said outflow are separated from one another by said pressing member as an annular ceiling section of said cooling channel, and
- wherein said wall of said cooling channel is supported mechanically on one side and fluidically on the other side.

\* \* \* \* \*